(12) United States Patent
Beckmann

(10) Patent No.: US 7,769,662 B2
(45) Date of Patent: Aug. 3, 2010

(54) TAX DEDUCTION REVALUATION SYSTEM

(76) Inventor: William H. Beckmann, 43 Lambert Ridge, Cross River, NY (US) 10518

( * ) Notice: Subject to any disclaimer, the term of this patent is extended or adjusted under 35 U.S.C. 154(b) by 709 days.

(21) Appl. No.: 11/503,212

(22) Filed: Aug. 14, 2006

(65) Prior Publication Data

US 2008/0040247 A1 Feb. 14, 2008

Related U.S. Application Data

(60) Provisional application No. 60/708,358, filed on Aug. 15, 2005.

(51) Int. Cl.
*G06Q 40/00* (2006.01)
(52) U.S. Cl. .................................... 705/36 T
(58) Field of Classification Search ............... 705/36 T
See application file for complete search history.

(56) References Cited

U.S. PATENT DOCUMENTS

2007/0156564 A1\* 7/2007 Humphrey et al. ......... 705/36 T

OTHER PUBLICATIONS

Freytag, Johann-Christoph; Lockemann, Peter C; Abiteboul, Serge; Carey, Michael; Selinger, Pat; Heuer, Andreas. 29th International Conference on Very Large Databases. Morgan Kaufmann Publishers. 2003. p. 1120.\*
Tyson, Eric & Silverman, David; Taxes for Dummies: 2003 Edition. Wiley Publishing. 2003. pp. 141-146, 149-157 and 169-174.\*
Planned Giving Design Center, "Estate Tax Review," published May 5, 2003. http://www.pgdc.com/print/61287.
Internal Revenue Service, "Instructions for Form 706 (Rev. Oct. 2006)."

\* cited by examiner

*Primary Examiner*—Jason M Borlinghaus
(74) *Attorney, Agent, or Firm*—Steptoe & Johnson LLP

(57) ABSTRACT

A method and system for calculating a tax credit obtains a tax function $T(A)$, a value for deduction $(D)$, and a value for an income amount $(A)$ at which a computation is based. The method and system computes a tax credit $C=k(T(A)-T(A-(D-C)))$. The calculation may be done non-recursively or recursively by calculating values $C_{n+1}=k(T(A)-T(A-(D-C_n)))$.

20 Claims, 7 Drawing Sheets

Tax Deduction Revaluation System Data Flow

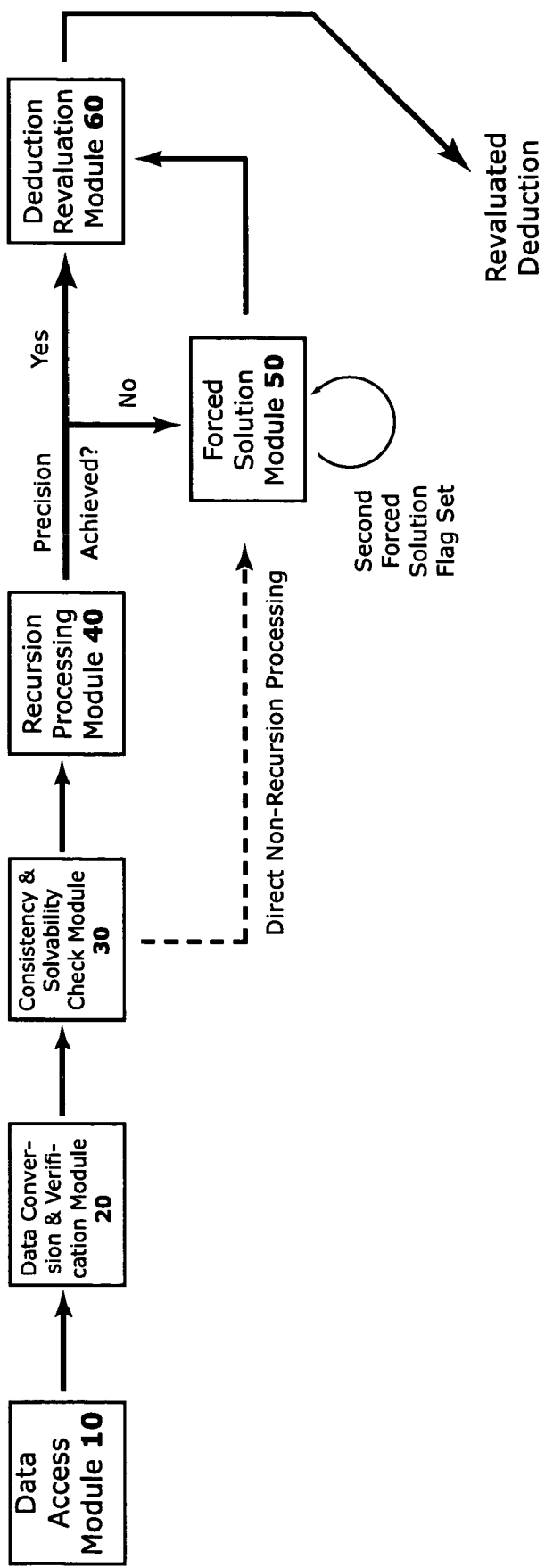

Figure 2 Illustrative Example Using Recursion with *k*=1

Figure 3 Illustrative Example Using Recursion with k=2

Figure 4 Illustrative Example Using Recursion with k=2.5

Figure 5 Illustrative Example Using Non-Recursion with $k=1$

|   | A | B | C | D | E | F | G | H | I | J | K | L | M | N | O | P |
|---|---|---|---|---|---|---|---|---|---|---|---|---|---|---|---|---|
| 1 |   | Tax Brackets |   |   | r |   b |   |   |   |   |   |   |   |   |   |   |
| 2 | $ 0.00 |   |   |   | 10% | 0.00 |   |   |   |   |   |   |   |   |   |   |
| 3 | $ 7,300.00 |   | 7,300.00 |   | 15% | -365.00 |   |   |   |   |   |   |   |   |   |   |
| 4 | $ 29,700.00 |   | 29,700.00 |   | 25% | -3335.00 |   |   |   |   |   |   |   |   |   |   |
| 5 | $ 71,950.00 |   | 71,950.00 |   | 28% | -5493.50 |   |   |   |   |   |   |   |   |   |   |
| 6 | $ 150,150.00 |   | 150,150.00 |   | 33% | -13001.00 |   |   |   |   |   |   |   |   |   |   |
| 7 | $ 326,450.00 |   | 326,450.00 |   | 35% | -19530.00 |   |   |   |   |   |   |   |   |   |   |
| 8 |   |   |   |   |   |   |   |   |   |   |   |   |   |   |   |   |
| 9 |   | Tax on | 7,300.00 |   | = | 730.00 |   |   |   |   |   |   |   |   |   |   |
| 10 |   |   | 29,700.00 |   | = | 4,090.00 |   |   |   |   |   |   |   |   |   |   |
| 11 |   |   | 71,950.00 |   | = | 14,652.50 |   |   |   |   |   |   |   |   |   |   |
| 12 |   |   | 250,000.00 |   | = | 69,499.00 |   |   |   |   |   |   |   |   |   |   |
| 13 |   |   |   |   |   |   |   |   |   |   |   |   |   |   |   |   |
| 14 |   |   |   |   |   |   |   |   |   |   |   |   |   |   |   |   |
| 15 | Recursion Values |   |   |   |   |   |   |   |   |   |   |   |   |   |   |   |
| 16 | A |   | $ 250,000.00 |   |   |   |   |   |   |   |   |   |   |   |   |   |
| 17 | D |   | $ 175,000.00 |   |   |   |   |   |   |   |   |   |   |   |   |   |
| 18 | T(A) |   | $ 69,499.00 |   |   |   |   |   |   |   |   |   |   |   |   |   |
| 19 | k |   | 2.00 |   |   |   |   |   |   |   |   |   |   |   |   |   |
| 20 |   |   |   |   |   |   |   |   |   |   |   |   |   |   |   |   |
| 21 |   |   |   |   |   |   |   |   |   |   |   |   |   |   |   |   |
| 22 | j |   | $r_j$ |   | $b_j$ | $k/(kr_j+1)$ |   | $(r_i-r_j)A$ |   | $r_j D$ |   | $b_i-b_j$ |   | $C_j$ |   | A-D+C_j in Bracket |
| 23 | 1 |   | 0.10 |   | 0.00 | 1.66667 |   | $ 57,500.00 |   | $ 17,500.00 |   | -13001.00 |   | $ 103,331.67 |   | 5 |
| 24 | 2 |   | 0.15 |   | -365.00 | 1.53846 |   | $ 45,000.00 |   | $ 26,250.00 |   | -12636.00 |   | $ 90,175.38 |   | 5 |
| 25 | 3 |   | 0.25 |   | -3335.00 | 1.33333 |   | $ 20,000.00 |   | $ 43,750.00 |   | -9666.00 |   | $ 72,112.00 |   | 4 |
| 26 | 4 |   | 0.28 |   | -5493.50 | 1.28205 |   | $ 12,500.00 |   | $ 49,000.00 |   | -7507.50 |   | $ 69,221.15 |   | 4 |
| 27 | 5 |   | 0.33 |   | -13001.00 | 1.20482 |   | 0.00 |   | $ 57,750.00 |   | 0.00 |   | $ 69,578.31 |   | 4 |

Figure 6 Illustrative Example Using Non-Recursion with $k=2$

Figure 7 Illustrative Example Using Non-Recursion with $k=2.5$

TAX DEDUCTION REVALUATION SYSTEM

The present patent application is based on Provisional Application No. 60/708,358, filed Aug. 15, 2005, the entire contents of which are hereby incorporated by reference in their entirety.

BACKGROUND OF THE INVENTION

1. Field of the Invention

The invention is useful in the field of data processing, and more particularly to computation of certain recursive values, such as tax deductions.

2. Discussion of Background Information

In the tax payment processes used by governments and other tax-imposing agencies for taxes such as income taxes, taxpayers are typically allowed to deduct certain expenses as the taxable amount is being calculated. One deduction commonly allowed is payment of other taxes.

Allowing a deduction creates a tax credit for the taxpayer, namely, the difference between the amount of tax that would have been paid if that deduction had not been allowed and the amount of tax paid if that deduction is allowed.

SUMMARY

A tax credit reduces the expense that formed the deduction so that the tax-imposing body is allowing the amount of deduction to be too large if the amount of the deduction allowed is the amount of the claimed expense. In this case, the valuation of the deduction is too high.

An object of the invention is to avoid over-valuation of a tax credit and correctly reduce the amount that the tax-imposing body returns to the taxpayer. In order to do this, the actual value of the tax credit created should satisfy the following:

$$\frac{\text{Tax Credit}}{\text{Dampening Factor}} = (\text{Tax Amount If Deduction Not Allowed}) - (\text{Tax Amount If Deduction Reduced By Tax Credit Is Allowed})$$

This is because the actual expense being incurred by the taxpayer is being reduced by the tax credit. This is the Tax Credit Definition on which the preferred embodiment of this invention is based. However, working with alternate tax credit definitions is within the scope of the invention.

The Dampening Factor is a factor inserted for flexibility to enable the tax-imposing body to reduce the tax credit granted depending upon the Tax Amount and the Deduction. For example, if the Tax Amount becomes large relative to other tax amounts in the taxable population, the tax-imposing body may wish to reduce the percentage of the Deduction that is allowed to be used to reduce the tax paid.

Another function of the Dampening Factor is to enable the tax-imposing body to maintain pre-existing or desired levels of tax revenues. Prior to implementation of this tax credit methodology, various techniques may have been used by the tax-imposing body—for example, "minimum tax models" such as the Alternative Minimum Tax and Corporate Minimum Tax models used in the United States—to disable the use of deductions by taxpayers to reduce taxes paid. For example: by setting the Dampening Factor to be very large relative to the Tax Amount and the Deduction, the left hand side of the above equation becomes nearly 0 (that is, smaller than the smallest unit of currency used) so that the Deduction is disallowed. Because the Dampening Factor can be varied according to the values of the Tax Amount and the Deduction, this provides great flexibility in managing the valuation of the tax credit and so the revaluation of the Deduction.

The true valuation of a deduction that should be allowed by the tax-imposing body is the expense amount that generates the deduction reduced by the tax credit calculated to solve the above equation.

This invention enables incorporation of tax deduction revaluation into general tax systems—the host systems that include and support all tax processing and calculation methods—and includes a system that performs the computations needed for the revaluation of claimed tax deductions. The invention is applicable to all tax systems including the U.S. Individual Income Tax (all filing statuses) and the U.S. Corporation Income Tax, but is not limited to these tax systems. The invention checks to be certain that the calculations for the tax credit and revaluation of the deduction can be carried out successfully in the tax system to which it is being applied.

The credit may be an approximation of the value expressed by equation, such as when a recursive calculation converges to within a specified limit.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 1 is a block diagram of a preferred embodiment of the present invention.

FIG. 2 illustrates an example of a deduction revaluation for k=2 using a recursive calculation.

FIG. 3 illustrates the example of FIG. 2 but for k=2.

FIG. 4 illustrates the example of FIG. 2 but for k=2.5.

FIG. 5 illustrates an example of a deduction revaluation for k=2 using a non-recursive calculation.

FIG. 6 illustrates the example of FIG. 5 but for k=2.

FIG. 7 illustrates the example of FIG. 5 but for k=2.5.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Referring to FIG. 1, the system is comprised of several different modules. The modules may be software or hardware. The primary modules are identified, described and interact with each other as follows.

A. Data Access Module

A Data Access Module 10 interfaces with data sources to obtain information that includes, but is not limited to:

(i) description of the tax function, including a definition of the tax function itself, tax brackets, and marginal tax rates (brackets and marginal rates can be derived from the definition of the tax function, if not provided separately);

(ii) value of the income amount, referred to in the following as the "base income" or the "taxable income," at which computations are based (e.g., adjusted gross income);

(iii) value(s) of the deduction(s) to be revaluated;

(iv) value of the dampening factor, or definition of a dampening factor function which can be applied to the income amount (ii) and the deduction(s) (iii);

(v) sensitivity coefficients—how much of an approximation is required of the system, usually to a certain fraction (½ or ¼) of the currency unit used in the tax processing; and (vi) numerical processing bound(s)—which, if provided, can override the default values set in a Recursion Processing Module 40 (discussed below).

B. Data Conversion & Verification Module

A Data Conversion & Verification Module 20 converts the information provided via the Data Access Module into forms used by the system. For example, if the tax function is specified by a table of values, it may be converted into a piecewise linear function whose coefficients are obtained by processing the values of the table.

If the information provided via the Data Access Module 10 is provided in forms that may be used by the system, such as a piecewise linear function including necessary coefficients, then this module may simply verify those forms and pass the information to a Consistency & Solvability Check Module 30 (discussed below). In this case, no conversion of data is performed.

Once the data provided via the Data Access Module 10 is in forms used by the system, this data is passed to a Consistency & Solvability Check Module 30. All data passed to the Consistency & Solvability Check Module 30 comes from this Data Conversion & Verification Module 20, even if no conversion of the data from the Data Access Module 10 occurs.

C. Consistency & Solvability Check Module

A Consistency & Solvability Check Module 30 checks the consistency of the data provided through the Data Conversion & Verification Module 20. These consistency checks may include, but are not limited to, verification of correct overlap of the taxable income intervals and associated coefficients for which the tax function is linear. These checks may also include confirmation that the tax function coefficients corresponding to marginal tax rates are monotonically increasing or, if they are not and if linear interpolation is required for computation, that the associated sensitivity parameters are sufficiently fine.

Using these checks, the system also verifies that the tax function provided can be successfully processed within the range of the data values provided by the Data Conversion & Verification Module 20 (such as base income amount, values of claimed deductions, dampening factor, and sensitivity parameters).

If the module determines that the tax function cannot be successfully processed, the system sends an Error Message to the host system and terminates.

The Consistency & Solvability Check Module 30 may set a Non-Recursion Processing Flag and pass the data obtained from the Data Conversion & Verification Module 20 (including, but not necessarily restricted to, the base income amount, the values of claimed deductions, and the dampening factor) to the Forced Solution Module 50 (discussed below).

D. Recursion Processing Module

A Recursion Processing Module 40 processes the tax function and the data provided, running an iterative recursion defined by the "Tax Credit Equation,"

$$\frac{C_{n+1}}{k} = T(A) - T(A - (D - C_n))$$

where T is the (converted) tax function, A is the value of the income amount at which the computation is based, D is the original value (obtained from the Data Conversion & Verification Module) of the deduction being revaluated, k is the dampening factor (possibly dependent on the values A and D), and $\{C_n\}$ is a recursive sequence of "tax credits" defined by this processing, beginning with $C_0=0$.

Note that although the natural definition of, and processing of, the Tax Credit Equation are recursive, it may be computationally optimal to use a non-recursive processing technique, as described below ("Forcing a Solution When Second Forced Solution Flag Is Set").

Although there may be other methods or processes for computing the tax credit to be allowed by the tax-imposing body, the Tax Credit Equation is consistent with, and reflects, the Tax Credit Definition. Any change in the Tax Credit Definition automatically changes the Tax Credit Equation, and vice versa. The system can handle different Tax Credit Definitions by applying the corresponding, different Tax Credit Equations.

The Recursion Processing Module 40 terminates when either: (i) two consecutive values of tax credits fall within the sensitivity parameter set in the Data Access Module 10 (or using a default value for sensitivity) or (ii) a numerical processing bound is reached.

The sensitivity of a computation in the system is the precision required by, or defined for, that computation. A sensitivity parameter is the parameter within the system that represents and is assigned the value for a sensitivity of a computation.

A numerical processing bound for a computation, which can be either a single calculation or a set of calculations, is a limit or bound imposed on one or more particular numerical characteristics of that computation. Such characteristics may include without limitation: number of iterations; total execution time for the computation; and size of a result of the computation. All numerical processing bounds for the system preferably have default values that can be overridden by values set in the Data Access Module 10.

The system preferably contains default values for all its sensitivities. These can be overridden by values obtained in the Data Access Module 10. The system also carries sensitivity flags. When a sensitivity flag is turned off, this indicates that the corresponding computation must yield exact value(s). By default, all sensitivity flags are preferably on. If a sensitivity flag is turned off, two values of the corresponding computation fall within the sensitivity parameter if and only if they are identical. If a sensitivity flag is turned on, two values of the corresponding computation fall within the sensitivity parameter if and only if the distance between them is less than the value of the sensitivity parameter.

If two consecutive values of tax credits fall within the sensitivity parameter, then the last value processed is returned as the Final Tax Credit.

If a numerical processing bound is reached without consecutive values of tax credits falling within the sensitivity parameter, the system sets a Forced Solution Flag, the effect of which is discussed below.

E. Forced Solution Module

A Forced Solution Module 50 executes if the Forced Solution Flag is set. The Forced Solution Flag is set only when a computation has not obtained results that fall within the sensitivity parameter but when a numerical processing bound has been hit or exceeded.

E.1. Non-Convergence of the Solution

There are two primary reasons why a Forced Solution Flag would be set. The first reason is that a computation that is being iterated will not converge to within the sensitivity parameter. The second reason is that the computation will converge, but the value of the numerical processing bound disallows a sufficient number of iterations of the computation for the results to fall within the sensitivity parameter. The first situation is described as true non-convergence, while the second is not true non-convergence.

If a Second Forced Solution Flag is not set (as discussed below), the Forced Solution Module 50 checks for true non-convergence of the tax credit sequence. True non-convergence, for the tax functions under consideration—functions $T(x)$ that are continuous, increasing ($T(x_1) \leq T(x_2)$ whenever $x_1 < x_2$), and non-negative ($T(x) \geq 0$)—occurs when there are two, distinct subsequences of the sequence $\{C_n\}$, each of which converges to a point of convergence, and these points of convergence are distinct. Specifically, there are two values $C' \neq C''$ where $C_{2n} \to C'$ and $C_{2n+1} \to C''$. This is detected by allowing the iteration to run long enough so that $|C_{2n+2} - C_{2n+3}|$ becomes much greater than either $|C_{2n} - C_{2n+2}|$ or $|C_{2n+1} - C_{2n+3}|$, say $$|C_{2n+2} - C_{2n+3}| > 100 \cdot \text{Max}(|C_{2n} - C_{2n+2}|, |C_{2n+1} - C_{2n+3}|)$$

for two (2) consecutive values of n. The value "100" used here is illustrative and can be adjusted as a system parameter. Similarly, the number ("2") of consecutive values for the sequential index n used here is simply illustrative and can also be adjusted as a system parameter. If true non-convergence is detected, then: (i) a Second Forced Solution Flag is set; (ii) a message is sent to the host system advising of occurrence of true non-convergence and including the computational parameters when such non-convergence occurred; and (iii) Forced Solution Module 50 is called again.

If there is no true non-convergence or if true non-convergence is not detected, then the Forced Solution Module 50 continues execution of the iterative recursion of the Tax Credit Equation. If two consecutive values of tax credits thus obtained fall within the sensitivity parameter, then the last value processed is returned as the Final Tax Credit and this module sends a message to the host system advising of a bad setting for a numerical processing bound for the system (because the Forced Solution Flag was set "prematurely").

If after continued execution a numerical processing bound again is reached before two consecutive values of tax credits fall within the sensitivity parameter, then: (i) a message is sent to the host system advising of failure of iterative execution and including the relevant computational parameters; (ii) a Second Forced Solution Flag is set; and (iii) the Forced Solution Module 50 is called again.

E.2. Forcing a Solution when Second Forced Solution Flag is Set

If a Second Forced Solution Flag is set, then the Forced Solution Module 50 takes the last two values of tax credits that had been obtained and determines a solution to the Tax Credit Equation lying between these two values of tax credits. In this case, the module may turn one or more sensitivity flags on, if they had been off (depending upon factors for optimizing system processing speed). This solution is returned as the Final Tax Credit and the Second Forced Solution Flag is cleared.

If the last two values of tax credits obtained were $C_{L-1}$ and $C_L$, then a brute force technique for forcing a solution may be to have the Forced Solution Module 50 examine each possible currency value between these two values.

However, a different approach is usually more efficient and also can be used to provide confirmation that the iterative solution converges to the correct solution for the tax credit (when the recursive processing converges). This approach can be used in addition to or instead of the iterative solution approach. Like the iterative solution, it originates from the Tax Credit Equation. If a Non-Recursion Processing Flag is set, this non-recursive approach is taken, as described in the following. A non-recursive method is implemented in a Non-Recursion Processing Module, a sub-module of the Forced Solution Module 50.

The non-recursive method uses the fact that tax functions are typically piecewise linear, being linear or affine (meaning that the tax function can be written in a form $T(x) = rx + b$) for the taxable income values x in an individual tax bracket. The value r is referred to as the "marginal tax rate" for this bracket.

Suppose that the tax bracket boundaries are listed as the m values $\{A_0 = 0, A_1, \ldots, A_{m-1}\}$, where the first tax bracket is the taxable income A such that $A_0 = 0 \leq A < A_1$, the second tax bracket is the taxable income A such that $A_1 \leq A < A_2$, the $j^{th}$ tax bracket is the taxable income A such that $A_{j-1} \leq A < A_j$, and the last ($m^{th}$) tax bracket is all taxable income A such that $A_{m-1} \leq A$. Conceptually, we can consider $A_m = \infty$ so the $m^{th}$ tax bracket is all taxable incomes A such that $A_{m-1} \leq A < A_m = \infty$.

Write the tax function for the $j^{th}$ tax bracket as $T(x) = r_j x + b_j$ (as obtained from the Data Conversion & Verification Module). If Forced Solution Module 50 is given the values A for taxable amount, D for original deduction amount, and k for the dampening factor, the Non-Recursion Processing Module will identify a value i so that A lies in the $i^{th}$ tax bracket and will form the i values $$\left\{ C_j = \frac{k}{kr_j + 1}((r_i - r_j)A + r_j D + b_i - b_j) \right\}_{j=1}^{i}.$$

The Non-Recursion Processing Module then checks to see if $A - D + C_j$ lies in the $j^{th}$ tax bracket: if it does, then the correct value for the tax credit is $C = C_j$. There will be exactly one value j for which $A - D + C_j$ lies in the $j^{th}$ tax bracket. This value $C_j$ is returned as the Final Tax Credit and the Second Forced Solution Flag is cleared. If this non-recursive method was called by the Non-Recursion Processing Flag, this flag is not cleared and the value $C_j$ is returned as the Final Tax Credit.

F. Deduction Revaluation Module

A Deduction Revaluation Module 60 takes the value of the Final Tax Credit obtained. If the Forced Solution Flag is not set, this module takes the value of the Final Tax Credit from the Recursion Processing Module 40. If the Forced Solution Flag is set or if the Non-Recursion Processing Flag is set, this module takes the value of the Final Tax Credit from the Forced Solution Module 50 and clears the Forced Solution Flag or the Non-Recursion Processing Flag.

The Deduction Revaluation Module 60 checks that the Final Tax Credit is a solution to the Tax Credit Equation, to within sensitivity set for this solution and verified by the Consistency & Solvability Check Module 30. If it is not a solution, the Deduction Revaluation Module 60 sends an Error Message to the host system and the system terminates. If it is a solution, then the Deduction Revaluation Module 60 reduces the value of the deduction obtained from the Data Access Module 10 by the value of the Final Tax Credit and returns this reduced value as the Revaluated Deduction. This Revaluated Deduction is the value of the deduction to be allowed by the taxing entity.

The Deduction Revaluation Module 60 then checks if further runs of the system are required for multiple deduction amounts obtained by the Data Access Module 10. If so, this module calls the Consistency & Solvability Check Module 30.

G. An Example Illustrating Deduction Revaluation

Figure 2:
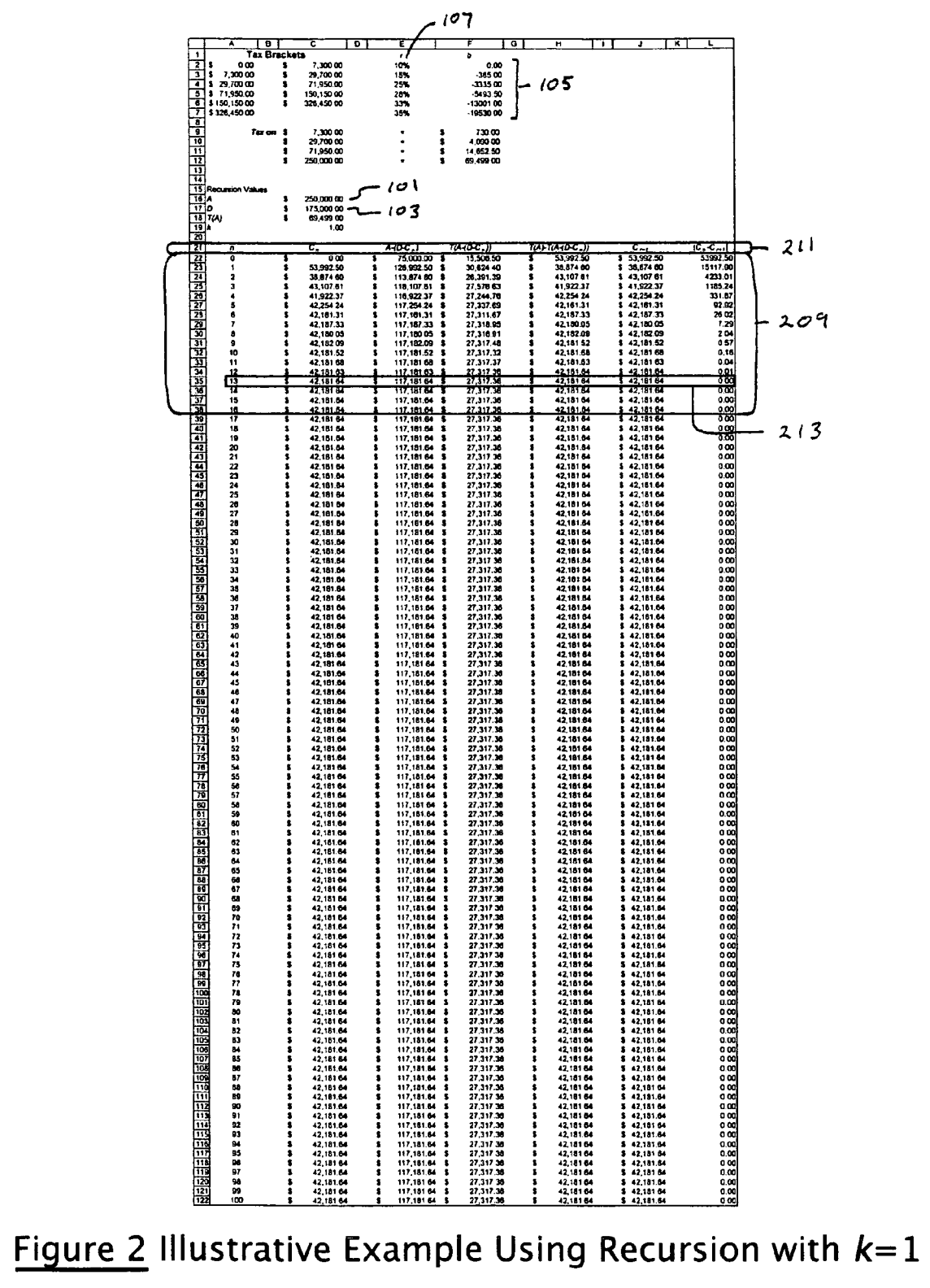

FIGS. 2-7 illustrate examples of deduction revaluation. These examples consider an individual taxpayer in the United States filing federal income tax under Schedule X (filing status of Single) for Tax Year 2005. In this example, the individual taxpayer has taxable income of (A) 103 of $250,000. This is the amount (the adjusted gross income) that would appear in lines 37 and 38 of IRS Form 1040 (2005). Deductions (D) 103 total $175,000. For example, this may be the amount that appears on line 28 of Schedule A (Form 1040) 2005, or this amount could be the sum of all deductions input into that Schedule A.

Under Schedule X in Tax Year 2005, there were six (6) tax brackets 105 with the boundaries being {$0, $7,300, $29,700, $71,950, $150,150, $326,450}. The marginal tax rates 107 for those brackets were {10%, 15%, 25%, 28%, 33%, 35%}.

Figure 3:
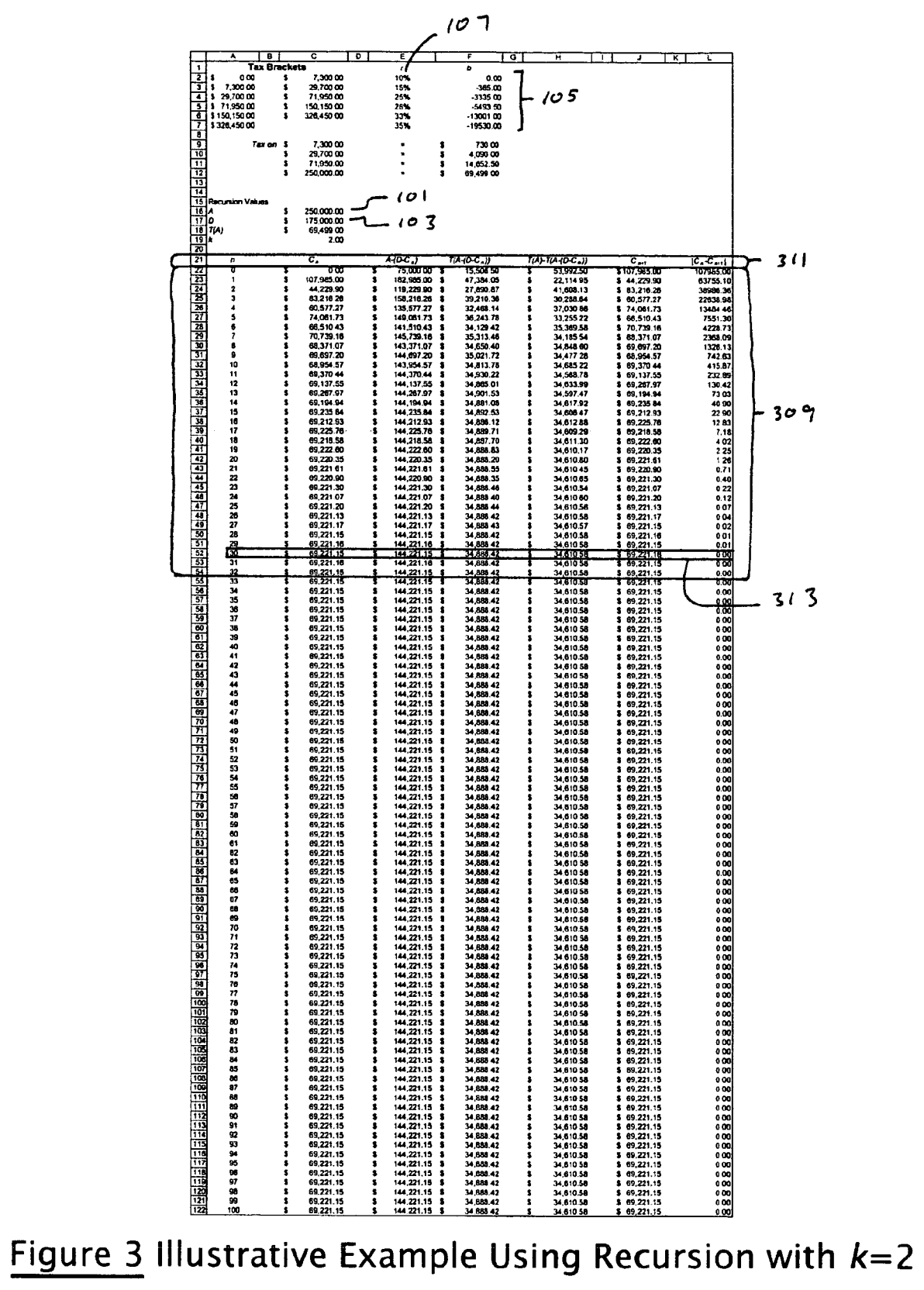
Figure 4:
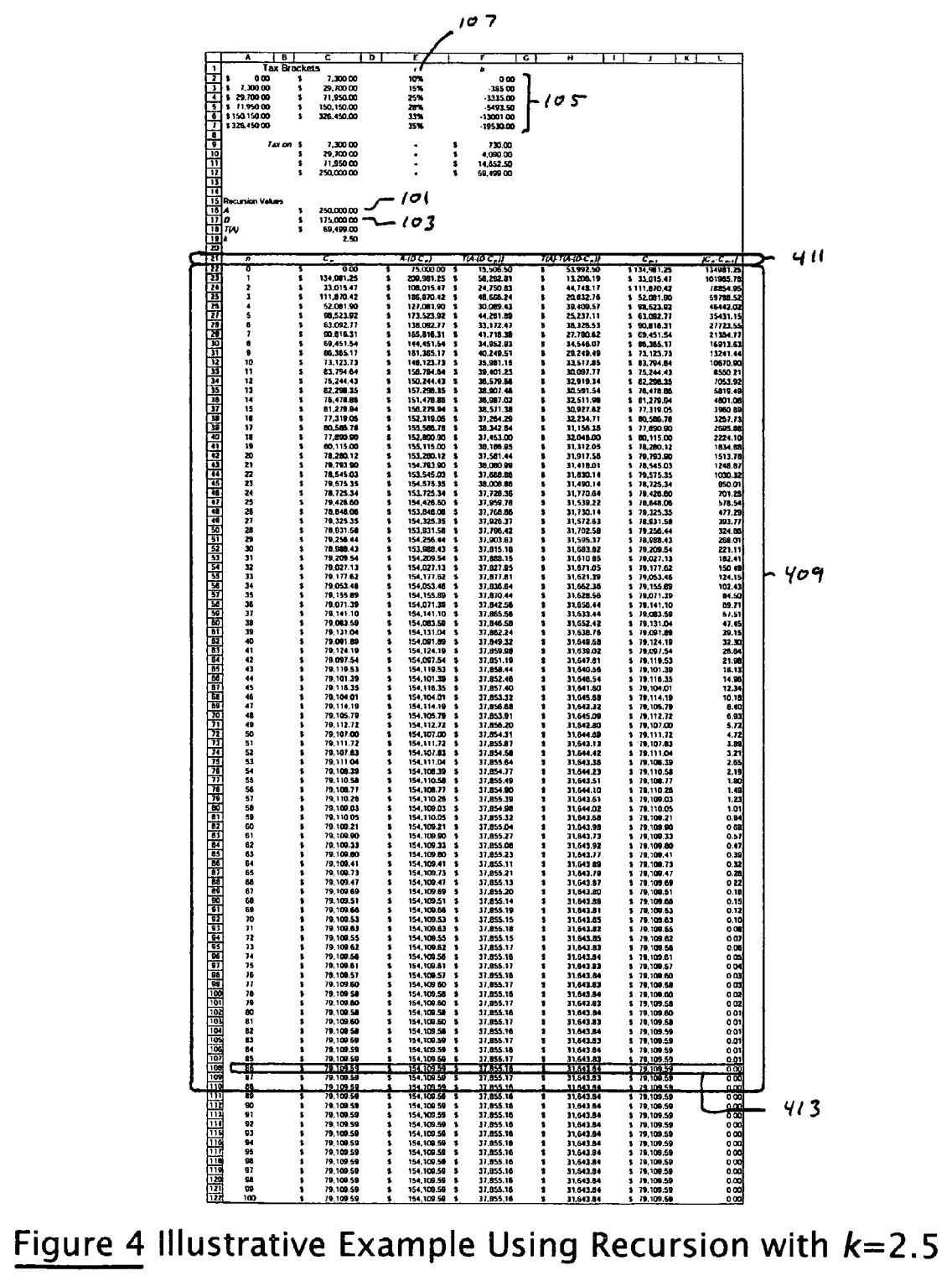

FIGS. 2, 3 and 4 respectively show recursive values 209, 309, 409 under three different values assigned to the Dampening Factor: 1, 2, and 2.5. The illustrated recursive algorithm was implemented in a Microsoft Excel spreadsheet, though other implementations may be used. FIGS. 2, 3, and 4 show spreadsheets for the three different values of the Dampening Factor (k=1, 2, 2.5).

The programming in the spreadsheets uses only Excel spreadsheet functions. Cell formulas are shown at heads of columns 211, 311, 411. For example, in FIG. 2, cell F22 calculates the tax T on $75,000=A−(D−$C_0$) (the value in cell E22) by using the formula "=VLOOKUP(E22, $A$2:$F$7, 5, TRUE)*E22+VLOOKUP(E22, $A$2:$F$7, 6, TRUE)." Here, the array $A$2:$F$7 is the table of tax brackets 105 in the upper left corner of the spreadsheet.

In the example represented in FIG. 2, A=$250,000, D=$175,000, and k=1. Using a sensitivity of 1¢ ($0.01), the smallest unit of currency in this example, the recursion converges 213 in 13 iterations and shows that C=$42,181.64. This means that the deduction should be reduced from $175,000 to $132,818.36, increasing the tax paid from $15,506.50 (if the full deduction were allowed) to $27,317.00 (rounding to the nearest dollar).

FIG. 3 shows the same example as FIG. 2 but for k=2. The recursive algorithm converges 313 after 30 iterations. FIG. 4 shows the same example as FIG. 2 but for k=2.5. The recursive algorithm converges 413 after 108 iterations.

Figure 5:
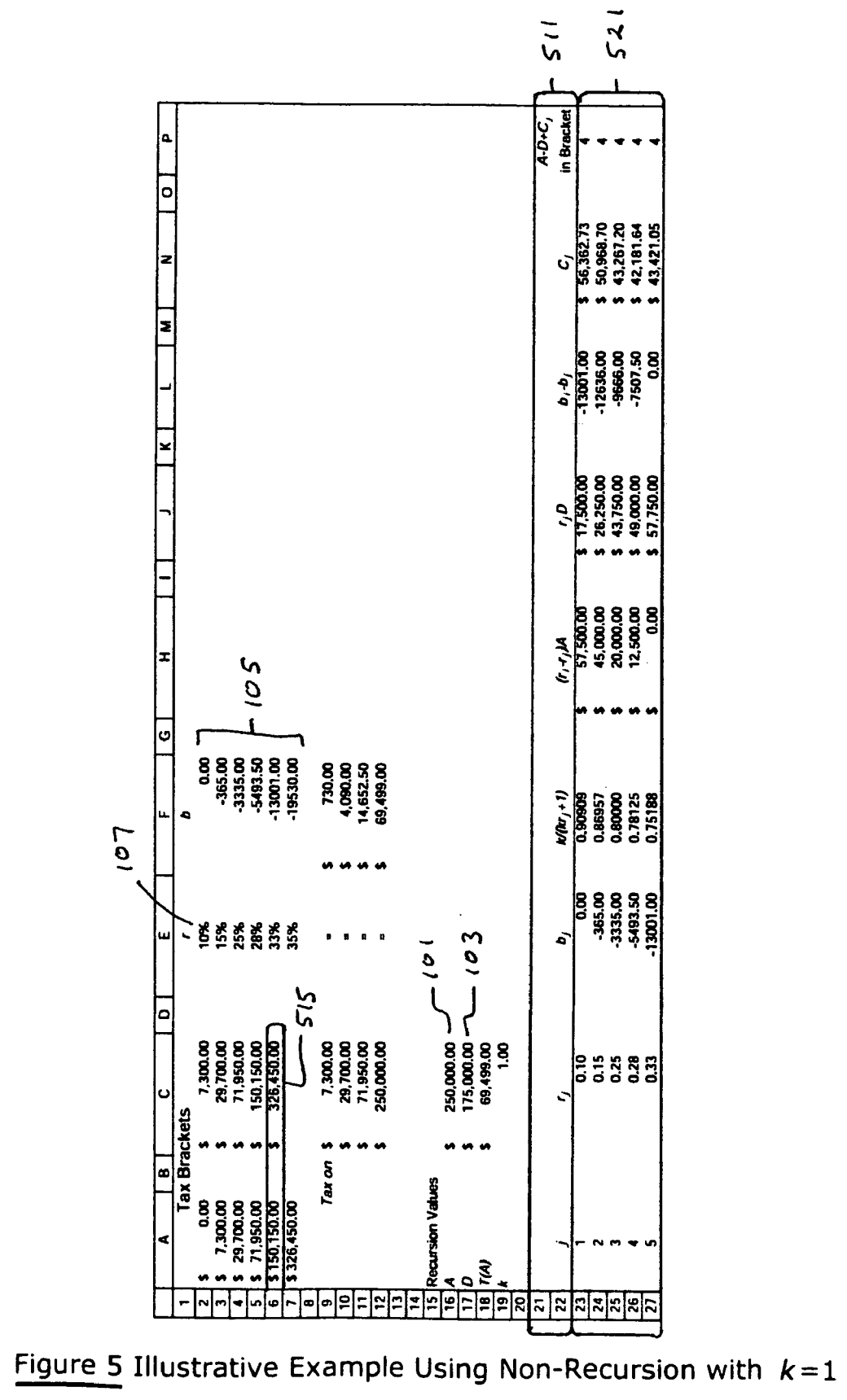

FIG. 5 illustrates the example of FIG. 2 but using a non-recursive algorithm. The taxable income 101 ($250,000) falls into the fifth tax bracket 515 of the Schedule X tax table 105, so that i=5, in the notation of section E.2. Therefore, the values $C_j$, for $1 \leq j \leq i=5$, are calculated (column N 517) and the tax brackets of the corresponding values A−D+$C_j$ are identified (column P 519). Because all of these values lie in tax bracket 4, the only match is at j=4; and $C_4$=$42,181.64 (cell N26 521). This agrees with the result obtained via recursion in FIG. 2.

FIGS. 6 and 7 illustrate the example of FIG. 5 but for k=2 and 2.5 respectively.

From FIGS. 2, 3, and 4, it is clear that as the Dampening Factor increases, the amount of the revaluated deduction decreases (because the tax credit increases). It is also clear that as the Dampening Factor increases, the recursion converges more slowly. For example, for k=3 (not illustrated), more than 1,000 iterations would be required to push consecutive values of the tax credit sequence {$C_n$} to within $0.01 of each other.

Slow convergence is not an issue when the non-recursive processing technique of E.2 is used. As is illustrated in FIGS. 5, 6, and 7, the algorithm settles 521, 621, 721 in the same number of iterations. Indeed, it will always be the case—regardless of the value of the Dampening Factor—that the maximum number of computations to be made using this non-recursive processing technique will be the number of tax brackets in the tax function. For this example, the tax function has six (6) brackets; but because the taxable amount A lies in the $5^{th}$ bracket, at most 5 computations are required.

H. Exemplary Hardware and Software Systems

The system described herein can be implemented as a standalone system (e.g., using a computer program such as Microsoft Excel, as demonstrated in the previous example in section G). In such an implementation, some of the functionality associated with the Data Access Module 10, the Data Conversion & Verification Module 20, the Consistency & Solvability Check Module 30, and the Deduction Revaluation Module 60 may be performed manually by the user in conjunction with functionality provided by the computer, operating system, and application programs. This was demonstrated in the example in section G.

Because the preferred embodiment is designed to be usable as an alternate method to existing methods for evaluating and managing tax deductions in tax processing systems, the preferred embodiment can be implemented as a system of software modules, with interface(s) to the host system defined by the Application Programming Interfaces (APIs) of the host system, so long as the host system can provide the data required by this Tax Deduction Revaluation system via Data Access Module 10. The preferred embodiment is designed so that the processing load on the host system induced by inclusion of this system of software modules can be controlled, monitored, and optimized. The (recursive and/or non-recursive) algorithmic processing required for this system is minimal. The incremental processing, memory, and data storage requirements imposed on the host system are minimal to the point that no hardware modifications or enhancements may be necessary.

The source code of the software implementing the preferred embodiment can be written in any standard programming language, including, but not restricted to, C, C++, Java, and Perl. Pre-programmed scripts, spreadsheets, and other files may be distributed by transportable storage media, such as CD Rom, or by electronic transmission, such as over the Internet.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method, implemented through software operating in conjunction with computer hardware, for calculating a tax credit comprising:
   obtaining, implemented through software operating in conjunction with computer hardware, a tax function $T(A)$;
   obtaining, implemented through software operating in conjunction with computer hardware, a value for a deduction D;
   obtaining, implemented through software operating in conjunction with computer hardware, a value for an income amount A at which a computation is based;
   obtaining, implemented through software operating in conjunction with computer hardware, a dampening factor k based on at least A and D;
   computing, implemented through software operating in conjunction with computer hardware, a tax credit C from at least one of:
   (a) non-recursively computing $C=k(T(A)-T(A-(D-C)))$;
   (b) recursively computing $C_{n+1}=k(T(A)-T(A-(D-C_n)))$; and
   returning, implemented through software operating in conjunction with computer hardware, a revalued deduction amount D–C for said non-recursive computing, and a revalued deduction amount $D-C_{n+1}$ for said recursive computing.

2. A method as in claim 1 wherein the step of computing a tax credit includes a step of recursively computing a tax credit $C_{n+1}=k(T(A)-T(A-(D-C_n)))$.

3. A method as in claim 1 wherein the step of computing a tax credit includes a step of non-recursively computing a tax credit $C=k(T(A)-T(A-(D-C)))$.

4. A method as in claim 1 wherein the step of computing a tax credit includes steps of:
   (a) recursively computing a tax credit $C_{n+1}=k(T(A)-T(A-(D-C_n)))$ until convergence is reached or no convergence is reached after a predetermined effort; and
   (b) if no convergence is reached after a predetermined effort, non-recursively computing a tax credit $C=k(T(A)-T(A-(D-C)))$.

5. A system for calculating a tax credit comprising:
   a first module obtaining a tax function T(A), a value for a deduction (D), a value for an income amount (A) at which a computation is based, and a dampening factor (k) based on (A) and (D);
   a second module computing a tax credit from at least one of:
   (a) non-recursively computing $C=k(T(A)-T(A-(D-C)))$;
   (b) recursively computing $C_{n+1}=k(T(A)-T(A-(D-C_n)))$; and
   a third module for returning a revalued deduction amount (D–C) for said non-recursive computing, and a revalued deduction amount $D-C_{n+1}$ for said recursive computing.

6. A system as in claim 5 wherein the second module recursively computes a tax credit $C_{n+1}=k(T(A)-T(A-(D-C_n)))$.

7. A system as in claim 5 wherein the second module non-recursively computes a tax credit $C=k(T(A)-T(A-(D-C)))$.

8. A system as in claim 5 wherein the second module includes:
   (a) a module for recursively computing a tax credit $C_{n+1}=k(T(A)-T(A-(D-C_n)))$ until convergence is reached or no convergence is reached after a predetermined effort; and
   (b) a module for, if no convergence is reached after a predetermined effort, non-recursively computing a tax credit $C=k(T(A)-T(A-(D-C)))$.

9. A computer program product for calculating a tax credit comprising a memory having computer readable code embodied therein, for execution by a CPU, said code comprising:
   a first computer program code module obtaining a tax function T(A), a value for a deduction (D), a value for an income amount (A) at which a computation is based, and a dampening factor (k) based on (A) and (D);
   a second computer program code module for computing a tax credit from at least one of:
   (a) non-recursively computing $C=k(T(A)-T(A-(D-C)))$;
   (b) recursively computing $C_{n+1}=k(T(A)-T(A-(D-C_n)))$; and
   a third computer program code module for returning a revalued deduction amount (D–C) for said non-recursive computing, and a revalued deduction amount $D-C_{n+1}$ for said recursive computing.

10. A product as in claim 9 wherein the second module recursively computes a tax credit $C_{n+1}=k(T(A)-T(A-(D-C_n)))$.

11. A product as in claim 9 wherein the second module non-recursively computes a tax credit $C=k(T(A)-T(A-(D-C)))$.

12. A product as in claim 9 wherein the second module includes:
   (a) a module for recursively computing a tax credit $C_{n+1}=k(T(A)-T(A-(D-C_n)))$ until convergence is reached or no convergence is reached after a predetermined effort; and
   (b) a module for, if no convergence is reached after a predetermined effort, non-recursively computing a tax credit $C=k(T(A)-T(A-(D-C)))$.

13. The method of claim 4, wherein the predetermined effort is a predetermined time or a predetermined number of attempts.

14. The system of claim 8, wherein the predetermined effort is a predetermined time or a predetermined number of attempts.

15. The product of claim 12, wherein the predetermined effort is a predetermined time or a predetermined number of attempts.

16. A computer readable memory having recorded thereon statements and instructions for execution by a computer to carry out the method for calculating a tax credit, the method for execution by a computer comprising:
   obtaining a tax function $T(A)$;
   obtaining a value for a deduction D;
   obtaining a value for an income amount A at which a computation is based; and
   computing a tax credit from at least one of:

(a) non-recursively computing $C=k(T(A)-T(A-(D-C)))$; and
(b) recursively computing $C_{n+1}=k(T(A)-T(A-(D-C_n)))$.

17. The computer readable memory of claim 16, further comprising computing k, which is a dampening factor, based on at least A and D.

18. The computer readable memory of claim 17, further comprising returning a revalued deduction amount D–C.

19. The computer readable memory of claim 16, further comprising returning a revalued deduction amount D–C.

20. The computer readable memory of claim 16, wherein the step of computing a tax credit includes steps of:
(a) recursively computing a tax credit $C_{n+1}=k(T(A)-T(A-(D-C_n)))$ until convergence is reached or no convergence is reached after a predetermined effort; and
(b) if no convergence is reached after a predetermined effort, non-recursively computing a tax credit $C=k(T(A)-T(A-(D-C)))$.

* * * * *